Jan. 9, 1945. M. LEVINE 2,366,917
SYSTEM FOR AND METHOD OF TREATING SEWAGE OR OTHER WASTE MATERIAL
Filed Feb. 26, 1938
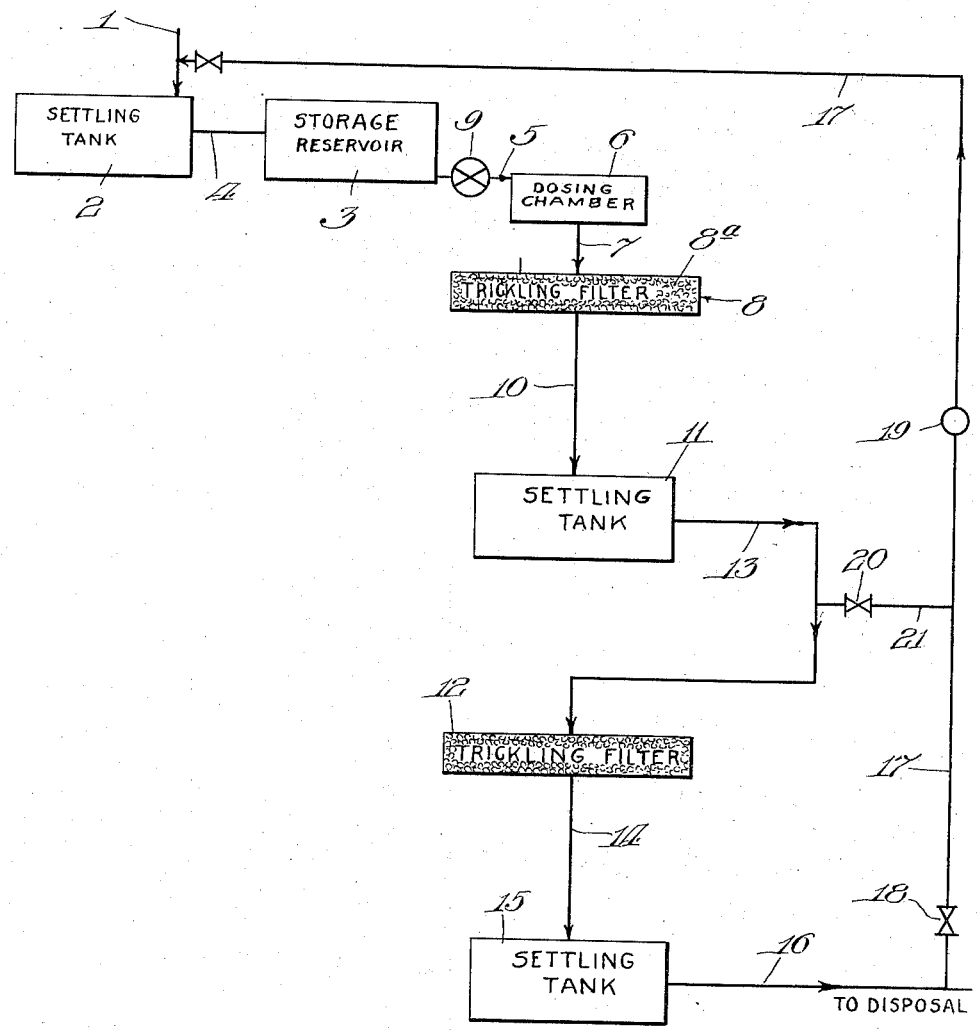
Inventor:
Max Levine
by Davis, Lindsey, Smith & Shonts
Attys.

Patented Jan. 9, 1945

2,366,917

UNITED STATES PATENT OFFICE 2,366,917

SYSTEM FOR AND METHOD OF TREATING SEWAGE OR OTHER WASTE MATERIAL

Max Levine, Ames, Iowa, assignor, by mesne assignments, to Iowa State College Research Foundation, Ames, Iowa, a corporation of Iowa Application February 26, 1938, Serial No. 192,685

3 Claims. (Cl. 210—5)

My invention relates generally to the treatment of sewage or other waste material for final disposal purposes, and it has to do especially with a system for and method of treating such material by subjecting it to the action of a trickling filter.

The raw or unfiltered sewage contains organic material in three forms, namely, colloidal, suspended and dissolved. Customarily, raw or unfiltered sewage material is first subjected to a primary treatment wherein it is passed through a settling tank where the settleable suspended solids are settled out. Usually, after settling, the liquid contains from 50 to 75 per cent of the original organic material, and the greater part of this organic material is either dissolved or colloidal. Before sewage material from the settling tank is discharged to a point of final disposal, it is customary to treat it in such a way that it is free from objectionable polluting constituents. Various processes have been employed for this purpose, one of which is filtration, wherein the sewage material is subjected to a secondary treatment by passing it through a trickling filter.

Trickling filters as heretofore employed are single-bed structures wherein the complete filtering operation is carried out. They usually comprise a bed of coarse material, such as gravel or crushed stone, which is from 6 to 10 feet in depth and many hundreds of square feet in area. The sewage material is fed to the upper surface of the filter by any suitable means such as the usual stationary spray devices or traveling or rotary distributor devices, and the material so applied trickles down through the filter bed to an underdrain which discharges the same to a desired point of disposal. In the use of such a filter, a gelatinous film forms upon the surface of the filter media, and this film supports a heavy growth of active bacteria and plant life which acts upon the sewage material in such a manner as to change the form of the organic material from an objectionable putrescible one into a stable one substantially free from polluting influence. Such a filter bed functions both mechanically and biologically in the performance of its functions.

Experience has shown that in the functioning of trickling filters of the character wherein the complete purifying action takes place in a single filter bed, the biological reactions are divided into zones in which different types of micro-organisms act upon the sewage material. Important constituents of the raw or unfiltered material are the organic nitrogen compounds, and this material is, therefore, of a putrefying character. In feeding this material to the usual trickling filter, the complex organic nitrogen compounds are decomposed in the upper portion of the filter to more simple nitrogen compounds and ammonia. I have also found that considerable of the material, after being passed through this zone, which I will term the "ammonification zone," is reduced to such a flocculent state that it is readily settleable, but that characteristic cannot be utilized to advantage in a single-bed filter.

In the lower portion of the filter, the nitrogeneus compounds that are formed in the upper zone or top portion of the filter are decomposed or converted first to nitrites and eventually, in the lowermost portion of the filter, the nitrites are oxidized to nitrates. Each of these oxidizing actions requires a different type of micro-organism and by the time the material has passed through the lowermost zone, which I will term the "nitrification zone," it is in a stable, non-putrefying condition, ready for final disposal, provided, however, certain limiting conditions are adhered to, including low rates of application and organic loadings.

It has been found, in the use of prior single-bed trickling filter systems, that the ammonification action takes place to varying depths, dependent upon the organic load applied to the filter or the rate of application of the material to the filter. If a constant concentration of the same sewage constituents were fed to the filter at a substantially constant rate, then a rather well developed and definite ammonification zone could be established; but since any particular sewage material varies widely in composition, with variation in the organic load, the maintenance in a single filter body of permanent zones of definite character would be impossible. Also, in the use of a single filter bed to carry out the complete filtering action, material advantages that may be gained by the flocculation of the material in the ammonification zone are lost.

Furthermore, customary practice in the use of a single trickling filter bed has dictated a comparatively low rate of application in order to accomplish the intended filtering action, thereby considerably lowering the capacity of any given size of filter body. I have found that the characteristics of the upper or ammonification zone of prior single-bed filters are such that the desired ammonification and flocculation actions take place at much higher rates than the nitrification action in the lower zone, and, consequently, if these two stages occur in a single filter, either the ammonification action is taking place at a lower rate than its normal capacity to accommodate a proper nitrification action; or, if it is taking place at a rate near its normal capacity, the nitrification action will not be carried to completion and the effluent will not be sufficiently stabilized for final disposal. In fact, I have found that the ammonification zone is capable of handling high organic loadings far in excess of 2,000 pounds B. O. D. per acre-foot, which loading appears to be beyond the capabilities of the nitrification zone where both zones are included in the same filter bed. As a result, the maximum rate of application or maximum organic loadings employed in the operation of the present single-bed filter systems is comparatively low, notwithstanding the ability of the ammonification zone to handle high rates of application and organic loadings, the rate being limited to the ability of the nitrification zone to properly oxidize and stabilize the material. Also, clogging may take place in the nitrification zone if its normal organic loading capacity is exceeded. In fact, present practice has dictated that the maximum organic loading for trickling filters heretofore used should not exceed approximately 250 pounds B. O. D. per acre-foot.

One of the objects of my invention is to provide an improved trickling filter treatment for sewage or other waste material whereby the shortcomings of prior trickling filter systems are eliminated and high rates of application or high organic loadings may be employed with high filtration efficiency.

Another object of my invention is to provide a treatment for sewage or other waste material wherein the full benefits of the normal biological zoning of a trickling filter are obtained notwithstanding variations in material composition, in material flow, in rate of application or organic loadings.

A further object of my invention is to provide a sewage treatment of the foregoing character wherein the material is first subjected to a flocculating and ammonification action in one zone and finally to a nitrification action in another and separated zone. That is, the zoning action of the ordinary filter is carried out in separated zones wherein the normal functioning of one is not limited by the other.

Still another object is to provide for an improved treatment of the foregoing character, whereby overloading of the nitrification zone is avoided by reducing the organic loading of the material after it passes the ammonification zone and before it reaches the nitrification zone.

A further object is to provide an improved filtering treatment for sewage or other waste material whereby the material is completely stabilized for final disposal purposes, even when maximum rates of application are employed, by interrupting the treatment at the end of the flocculating and ammonification stage and prior to the nitrification stage and removing settleable solids.

Still another object is to provide an improved filtering treatment for sewage or other waste material wherein the material is fed to a primary trickling filter zone at such a rate of application that ammonification and flocculation action takes place therein, and the material thus treated is then fed at a lower rate of application to a secondary zone wherein a nitrification action takes place.

A further object is to provide for the feed of the material to a trickling filter in such a manner that, notwithstanding normal variations in flow and concentration of the sewage material as received from its source, the material to be filtered is fed or dosed or applied to the filter at a substantially constant and uniform high rate of application.

Additional objects are to provide for the handling of higher rates of application or organic loadings than heretofore possible; to provide a treatment wherein the material to be filtered may be dosed continuously or the dosing cycles may be greatly reduced, all with increased filtering efficiency; to provide a filtering treatment whereby the cost of operation is reduced; to provide for smaller filters, thereby reducing installation costs; to provide for increased filter capacity whereby considerably more sewage may be treated in a given size filter unit or a smaller unit may be used to handle a given amount of material; and to provide for the direct filter handling of materials having a high concentration of B. O. D. like canning plant, creamery, packing house and other industrial wastes, without pre-treatment thereof.

Other objects and advantages will become obvious from the following description taken with the drawing wherein there is shown a flow diagram illustrating one system for carrying out my invention.

I have discovered that any method of operation of trickling filters which is conducive to establishment and maintenance of relatively stable biological zones will serve to increase the efficiency and constancy of filter accomplishments or of purification; and, in general, in practicing my invention, I physically separate the ammonification and nitrification zones of a trickling filter in such a way that they function as separate units. The first or primary zone is so constructed that the sewage material is applied thereto at such a rate or under such conditions of organic loading that it functions only as an ammonification zone wherein the material takes on a highly flocculent nature which conditions it for ready settling.

The second or secondary zone is so constructed and arranged and the material is fed thereto from the primary or ammonification zone at such a rate or under such conditions of organic loading, that it functions as a nitrification zone. The filtering process is interrupted by passing the effluent from the primary or ammonification zone to a settling zone where the greater part of the flocculent or settleable material therein is settled out. It will, therefore, be seen that the ammonification zone serves not only as a flocculator, but also as a conditioner for the final nitrification action by which the material is stabilized for final disposal; and, by interposing the settling zone, I gain the advantage of the flocculation function of the ammonification zone, which function, as already pointed out, is practically lost in filter structures heretofore employed. Furthermore, by physically separating the zones in the manner stated, the material may be fed to the ammonification zone at the very high rate of application which it is capable of handling without interfering with the proper function of the nitrification zone which is not capable of handling such high rates of application, the material being conditioned for the lower rate of application by reducing the organic loading of the material in the settling zone.

Further, in practicing my invention, particularly where the sewage or waste material is received from its source under conditions of variable flow and concentration, and in cases (packing house wastes, for example) where the peak flow coincides with the peak concentration, I control the concentration and/or flow of the material to be filtered in such a way that the material is applied to the ammonification filter zone at a constant uniform rate of application, thereby flattening out, so to speak, the peaks and valleys of the curves of concentration and/or flow of the waste being treated. I may accomplish this by storing excess flow from the waste source in equalizing or storage zones and by utilizing such stored material to supplement reduced or low flow from the waste source. The filtering structure employed may be sufficiently flexible to absorb moderate fluctuations in concentration and in volume, if such changed concentration and volume do not persist for too prolonged periods of time, say not over 3 or 4 hours. If, however, the fluctuations are very great there may be interference with the biological zoning referred to and consequently the efficiency will be decreased. This condition may readily be taken care of in the manner above stated, in that it would serve to increase the constancy of both the concentration and flow of waste onto the filter and thereby be conducive to maintenance of proper biological zones and high purification efficiency. Under some conditions the desired relative constancy of concentration and flow may be best attained by adding to the raw sewage a portion of the purified sewage. Whether partially or completely purified sewage may best be employed for this purpose will depend upon the nature of the waste to be treated and the degree of purification effected in the various stages of treatment.

Referring to the flow diagram of the drawing, the raw or unfiltered material is received at the plant from its source and is passed through suitable conduit means 1 to a settling tank 2 which is a primary treatment unit. In the settling tank 2, the settleable suspended solids are settled out and the other material or effluent is passed on to a storage or equalizing reservoir 3 through suitable conduit means 4. From the storage reservoir 3 the material is fed through a conduit 5 to a dosing chamber 6 in a controlled manner. The dosing chamber 6 feeds the material, in a manner which will be well understood, through conduit means 7 to a primary trickling filter 8 having a filter bed 8ᵃ. The dosing chamber 6 may take any desired form capable of handling the material in dosing cycles consisting of periods of feed and periods of rest. The means for controlling the flow of the material from the storage reservoir to the dosing chamber may take the form of any suitable device 9, such as a rate-of-flow controller, or the like, which is adapted to connect the storage reservoir 3 to the dosing chamber 6 and which is adapted to control the flow from the storage reservoir to the dosing chamber at a rate not to exceed the maximum capacity of the dosing equipment in the dosing chamber. In other words, through the use of the rate-of-flow controller 9, any variations in flow of the waste material, as received from its source, are smoothed out so that the dosing chamber functions to dose the trickling filter at a uniform rate of application. More particularly, during high peak flow periods when the material received from the source is in excess of that required for the normal rate of application as applied at the dosing chamber 6, the rate-of-flow controller 9 will function to store the excess material in the storage reservoir so that it will be available to compensate for and supplement the material flowing to the dosing chamber at periods of low flow, thereby serving to smooth out, so to speak, the peaks and valleys in flow occasioned by variation in flow of material from the source. Therefore, due to the action of the storage reservoir, the rate-of-flow controller 9 and dosing chamber 6, the material is dosed to the filter bed 8ᵃ at a substantially constant rate. It is to be understood that, while I have referred to a dosing chamber requiring intermittent periods of flow and periods of rest, a dosing chamber of a character adapted for continuous flow or dosing may readily be employed without departing from my invention. The sewage material may be distributed in any desired manner upon the surface of the filter bed 8ᵃ, as by stationary sprinkling devices, traveling or rotary distributor devices, or any other suitable and known means.

The primary filter bed 8ᵃ is, preferably, formed of larger or coarser filtering material than ordinarily employed, naturally forming larger voids or interstices therein. I have found that my invention may be practiced effectively by employing a primary filter depth of from 3 to 10 feet, depending upon the type of the waste to be treated, and by using a coarse filter bed material such as crushed rock or granite, ranging in size from 2½ to 4 inches, with most of the material of the larger size. It is to be understood that while the foregoing dimensions well serve the purposes of my invention, they may be varied without departing from my invention. One mechanical advantage in the use of the larger size material for the filter bed is that it provides larger voids or interstices therein and eliminates the possibility of clogging when the very high rates of application and organic loadings are employed.

The primary filter 8 also includes an underdrain system (not shown in detail) like ordinary filters, and this system is connected through suitable conduit means 10 to an intermediate or secondary settling tank 11. The settling tank 11 is, in turn, connected to a secondary trickling filter 12 through suitable conduit means 13. The filter 12 may be connected through conduit means 14 to another settling tank 15 which is, in turn, connected through a conduit 16 to a final point of disposal. Or, if desired, the filter 12 may be directly connected to the final point of disposal, since, as will be seen from the description which follows, the filtering action that takes place in carrying out my invention is so efficient that in most cases the effluent from the filter 12 will be properly and fully stabilized.

The secondary filter 12 may be of standard design, having a depth of approximately 6 feet, but the filtering material making up the filter bed 12ᵃ thereof is finer than that of the primary filter bed 8ᵃ. This filtering material may be as small as 1 to 1½ inches, ranging from this size up to 2½ or 3 inches. While I have found that filter structures following these dimensions give highly beneficial results, they may be varied without departing from my invention. The effluent passed from the secondary settling tank 11 to the secondary filter 12 is of such character that the smaller size bed material may be used for an effective nitrification action, without danger of clogging, due to the conditioning of the primary filter effluent for the settling out in the settling tank 11 of solids that would tend to clog the secondary filter. Also, the smaller-sized filter material in the secondary filter 12 will give a much greater area of contact and, consequently, increase the capacity of the filter for the oxidation of the material delivered thereto from the ammonification zone through the settling tank.

In the operation of the structure just described, the effluent from settling tank 2 in passing through filter 8 undergoes a biological or biochemical action together with the mechanical flocculation whereby the organic material is reduced to a readily settleable flocculent material and to ammonia compounds. Most of the flocculent material in the effluent from filter 8 is settled out and removed from the liquor by passing it through the settling tank 11. The effluent from the settling tank 11 still contains considerable organic materials which must be further treated before disposal; and these organic materials are in a form which will readily break down and putrefy and create a nuisance so that they must be oxidized to a stable form before disposal. This is taken care of by passing the effluent from the settling tank 11 through the secondary trickling filter or zone 12, wherein the ammonia and other nitrogen compounds after ammonification are oxidized first to nitrites and then to nitrates, which compounds are of a stable nature suitable for disposal.

By separating the filter zones as above stated, the primary filter 8 may be charged with sewage at a very high rate, for example, about 8 M. G. A. D., so as to obtain the advantages of the high application rates which that zone is capable of handling efficiently. Incidentally, by using high rates of application in the filter 8, the B. O. D. removal is very high. Not only is the biological action increased materially but, in addition, many of the sewage constituents which are colloidal become agglomerated into settleable solids when so charged upon the filter. The high rate of application means that the filter is self-cleaning, because much of the material which might tend to collect on the particles of rock is washed off as a settleable suspension. Consequently, the high application rates that may be employed will result in removal of many times more B. O. D. than is obtained when only biological action occurs as with the rates of application employed in prior systems. Also, by equalizing the concentration and/or flow to the primary filter 8, thereby smoothing out the peaks and valleys that would otherwise be caused by variation in concentration and flow from the source, the efficiency of the filter structure is increased and the capacity of any given filter unit may be materially increased.

In the settling tank 11 the agglomerated colloidal constituents settle out and by the time the sewage has passed the primary filter 8 and the settling tank 11, its B. O. D., in pounds, has been reduced many times more than in an ordinary trickling filter operating at ordinary rates of application. Also, the biological characteristics of the sewage constituents are very much different from that which entered the filter 8. A large portion of the organic nitrogen compounds have been decomposed to ammonia so that the effluent from the settling tank 11 can be looked upon as being somewhat similar to the sewage that enters the lower zones of an ordinary filter operating in the ordinary way, except that the settleable solids have been removed. Therefore, merely by feeding the effluent from the settling tank 11 to the filter 12, which is of the character above described, the nitrifying actions occur more efficiently. The nitrification and oxidization of the remaining compounds occur at a lower rate than do the purification reactions in the filter 8 and for this reason this filter 12 is charged at a lower rate, for example, about 3 M. G. A. D.

It will thus be seen that by providing two separate filters in the manner described, or by providing two-stage treatment with an intermediate settling operation, I am able to operate the primary filter 8 as an ammonification zone under conditions best suited to high efficiency thereto, at the same time providing a filter which operates most efficiently at high rates of application; and by providing the intermediate settling tank I am able to operate the secondary filter as a nitrification zone under conditions that are best suited to high efficiency thereto. In other words, the use of a two-stage filter treatment such as above described permits me to operate both filters under those ideal conditions which will give the highest removal of B. O. D. per unit volume and also permit me to design each filter, one independently of the other, so that the sizes of the filling material forming the beds thereof can be correctly correlated for highest efficiency—coarse material increases the efficiency of the primary filter or ammonification zone and smaller-size filling material increases the efficiency of the secondary or nitrification zone. By separating the zones, I provide and maintain permanent zones of definite character—one not hindered by the other in the performance of its full-capacity functions, thereby insuring best filter efficiency.

In fact, in practicing my invention, the rates of application are increased many fold so that the filter loading may be far in excess of 2000 pounds B. O. D. per acre-foot per day. The high rates of application do not mean that the filter is merely oxidizing more sewage, but what actually happens is that much of the colloidal material in the sewage is transformed into a flocculent material in the primary or ammonification zone which can be settled out by ordinary sedimentation in the settling tank 11. It is quite probable that half the B. O. D. removed at the high application rates stated is the result of this agglomeration of colloidal constituents; and, consequently, the effluent from the primary filter 8 contains large quantities of readily settleable solids, thus reducing to an extent far beyond the mere oxidizing function of the filter the concentration of the constituents which would have to be oxidized at a lower rate of application in the nitrification zone or filter 12. In the use of my invention additional reactions of a colloidal nature occur in the primary filter zone 8, and much of the sewage constituents which would ordinarily have to be oxidized, at the customary low rates of application, are readily settleable and are taken care of by the settling tank 11.

Further, in cases where the dosing involves a cycle including periods of rest to periods of dosing the complete cycle may be materially shortened with highly beneficial results. The complete period of dosing and rest elapsing between starting of two successive discharges of material upon a filter bed is generally referred to as the dosing cycle. Heretofore, dosing cycles of about 15 to 30 minutes or longer have been employed. I have discovered that it makes considerable difference whether a given volume of sewage is discharged onto an acre of filter in 24 hours, for example, by applying appropriate quantities every 20 minutes or, if the same volume is discharged in the same length of time, by applying the appropriate quantities every 5 minutes. In long dosing cycles there are marked surgings and effluent from the filter fluctuates synchronously with the dosing cycle. Shortly after the sewage is applied to the filter, the effluent or run-off is at a very rapid rate and then decreases. When the sewage is coming through rapidly, the B. O. D. is very high but then decreases. However, when the dosing cycle is reduced, say, for example, to 5 minutes, there is obtained a more even run-off and a marked decrease in the range of B. O. D. of different samples of the effluent or run-off. Furthermore, in this case the average B. O. D. of the effluent or run-off is considerably less for a 5-minute cycle than for a 20-minute cycle with the same filter and concentration of sewage. Therefore, in carrying forward my invention, I preferably employ dosing cycles of comparatively short duration, and preferably not more than 7 minutes—with high rates of application as above stated. It will be understood that, while highly beneficial results may be obtained in using the dosing cycle arrangement in practicing my invention, I do not intend to be limited to such arrangement because I have found that in rock filters the shorter the dosing cycle, the more efficient was the purification. Thus, maximum efficiency may be secured with continuous dosing.

As hereinabove pointed out, it may be desirable, in the handling of certain waste materials of high concentration or of variable concentration, such, for example, as packing house wastes, to provide for the regulation of the constancy of concentration and flow for the attainment of higher efficiency in practicing my invention. To this end, I may utilize completely purified or partially purified material. Specifically, referring to the flow diagram of the drawing, I may return purified effluent from the settling tank 15 to the settling tank 2 or I may return partially purified effluent from the settling tank 11 to the settling tank 2. More particularly, I may employ a conduit 17 leading from the conduit 16 to the inlet conduit 1 connected with the settling tank 2, the flow through such conduit being controlled by a valve 18 and the pump 19. In other words, when the valve 18 is opened and the pump operated, part of the flow through the conduit 16 is returned through the conduit 17 to the settling tank 2. The control of flow from the settling tank 11 to the settling tank 2 is controlled by a valve 20 in the branch conduit 21 and the pump 19; it being understood that when the flow is controlled in this latter way, the valve 18 is closed. It is to be further understood that, instead of returning the material to the settling tank 2, it may well be returned to any other point in the system before the primary filter 8, with the attainment of the desired relative constancy of concentration and flow above referred to.

It is believed that the operation and advantages of my invention will be understood from the foregoing description. Also, it will be understood that my invention is adapted for the treatment of sewage (domestic or otherwise) and other waste materials under varying conditions of service, all within the spirit and scope of the claims that follow.

I claim:

1. The method of treating sewage or other waste material which comprises the steps of receiving the raw or unfiltered material from its source, applying such material at a loading of at least 2000 pounds B. O. D. per acre-foot per day to a filter bed formed wholly of coarse-grained material having a particle size of about 2½ to 4 inches with most of the material of the larger size and having a depth of about 3 to 10 feet to effect ammonification and flocculation of said waste material, passing only the effluent from said filter bed to a settling zone in which settleable organic solids are removed therefrom, and then applying only the effluent from said settling zone to a second filter bed at a relatively reduced rate but not in excess of the organic loading capacity of said second filter bed, said second filter bed being formed wholly of a finer-grained material having a particle size of about 1 to 3 inches and a depth of about 6 feet to effect nitrification of said last-mentioned effluent.

2. The method of treating sewage or other waste material which comprises the steps of receiving the raw or unfiltered material from its source, applying such material at a rate of about 8 M. G. A. D. to a filter bed formed wholly of coarse-grained material having a particle size of about 2½ to 4 inches with most of the material of the larger size and having a depth of about 3 to 10 feet to effect ammonification and flocculation of said waste material, passing only the effluent from said filter bed to a settling zone in which settleable organic solids are removed therefrom, and then applying only the effluent from said settling zone at a rate of about 3 M. G. A. D. to another filter bed formed wholly of a finer-grained material having a particle size of about 1 to 3 inches and a depth of about 6 feet to effect nitrification of said last-mentioned effluent.

3. Apparatus for treating sewage or other waste material, which comprises means for receiving raw or unfiltered material from its source, a primary filter bed having a depth of about 3 to 10 feet and formed entirely of an aggregate having a particle size of approximately 2½ to 4 inches with most of the material of size larger than the minimum size, means for feeding said unfiltered material from said receiving means to said filter bed at such a rate as to supply the material thereto at a loading of at least 2,000 pounds B. O. D. per acre-foot per day, a settling tank, means for feeding the effluent from said filter bed to said settling tank, a secondary filter bed having a depth of approximately 6 feet and formed entirely of an aggregate having a particle size of approximately 1 to 3 inches, and means for feeding the effluent from said settling zone to said secondary filter bed at such a rate that the loading on the secondary filter bed is less than that on the primary filter bed.

MAX LEVINE.